(12) United States Patent
Koh et al.

(10) Patent No.: US 11,947,463 B2
(45) Date of Patent: Apr. 2, 2024

(54) METHOD AND APPARATUS FOR MANAGING MEMORY IN MEMORY DISAGGREGATION SYSTEM

(71) Applicant: ELECTRONICS AND TELECOMMUNICATIONS RESEARCH INSTITUTE, Daejeon (KR)

(72) Inventors: Kwang-Won Koh, Daejeon (KR); Chang-Dae Kim, Daejeon (KR); Kang-Ho Kim, Daejeon (KR)

(73) Assignee: ELECTRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 0 days.

(21) Appl. No.: 18/158,953

(22) Filed: Jan. 24, 2023

(65) Prior Publication Data
US 2023/0161708 A1 May 25, 2023

Related U.S. Application Data

(63) Continuation of application No. 17/324,883, filed on May 19, 2021, now Pat. No. 11,586,549.

(30) Foreign Application Priority Data

Jun. 15, 2020 (KR) .................. 10-2020-0072032

(51) Int. Cl.
*G06F 12/08* (2016.01)
*G06F 12/0862* (2016.01)
(Continued)

(52) U.S. Cl.
CPC ...... *G06F 12/0882* (2013.01); *G06F 12/0862* (2013.01); *G06F 12/0868* (2013.01); *G06F 12/0871* (2013.01); *G06F 12/0891* (2013.01)

(58) Field of Classification Search
CPC ............ G06F 12/0882; G06F 12/0862; G06F 12/0868; G06F 12/0871; G06F 12/0891;
(Continued)

(56) References Cited

U.S. PATENT DOCUMENTS 9,053,068 B2    6/2015  Tsirkin et al.
9,128,825 B1 *  9/2015  Albrecht ............ G06F 12/0253
(Continued)

FOREIGN PATENT DOCUMENTS

KR    10-2019-0042465 A    4/2019
KR    10-2019-0053086 A    5/2019
KR    10-2019-0087783 A    7/2019

*Primary Examiner* — Hua J Song

(57) ABSTRACT

Disclosed herein is an apparatus for managing disaggregated memory, which is located in a virtual machine in a physical node. The apparatus is configured to select, depending on the proportion of valid pages, direct transfer between remote memory units or indirect transfer via local memory for each of the memory pages of the source remote memory to be migrated, among at least one remote memory unit used by the virtual machine, to transfer the memory pages of the source remote memory to target remote memory based on the direct transfer or the indirect transfer, and to release the source remote memory.

6 Claims, 6 Drawing Sheets

(51) Int. Cl.
*G06F 12/0868* (2016.01)
*G06F 12/0871* (2016.01)
*G06F 12/0882* (2016.01)
*G06F 12/0891* (2016.01)

(58) Field of Classification Search
CPC ...... G06F 3/0617; G06F 3/0644; G06F 3/067; G06F 3/0635; G06F 9/45558; G06F 9/5016; G06F 9/5077; G06F 2009/45583
USPC .......................................................... 711/118
See application file for complete search history.

(56) References Cited

U.S. PATENT DOCUMENTS

| | | |
|---|---|---|
| 9,753,831 B2 | 9/2017 | Kivity |
| 10,509,728 B2* | 12/2019 | Guim Bernat ...... G06F 12/0223 |
| 10,754,547 B2 | 8/2020 | Kim |
| 10,789,090 B2 | 9/2020 | Koh |
| 2011/0271014 A1 | 11/2011 | Turner |
| 2015/0106582 A1 | 4/2015 | Mai et al. |
| 2016/0197997 A1* | 7/2016 | Fossen ................. H04L 67/1097 709/219 |
| 2019/0012109 A1* | 1/2019 | Byun .................... G06F 3/0679 |
| 2019/0114079 A1 | 4/2019 | Kim et al. |

\* cited by examiner

METHOD AND APPARATUS FOR MANAGING MEMORY IN MEMORY DISAGGREGATION SYSTEM

CROSS REFERENCE TO RELATED APPLICATION

This application is a continuation of U.S. patent application Ser. No. 17/324,883 filed May 19, 2021 and claims the benefit of Korean Patent Application No. 10-2020-0072032, filed Jun. 15, 2020, which is hereby incorporated by reference in its entirety into this application.

BACKGROUND OF THE INVENTION

1. Technical Field

The present invention relates generally to a method and apparatus for managing memory in a memory disaggregation system, and more particularly to a method and apparatus for managing memory in a memory disaggregation system in order to provide scalability improvement and to cope with failure in the memory disaggregation system.

2. Description of the Related Art

A memory disaggregation system operates using the memory of a local host machine, in which a virtual machine is located, and the memory of a remote machine interconnected with the local host machine. Recent developments in technology for interconnection between nodes minimize latency time in access to remote memory and provide high bandwidth, thereby providing performance comparable to that of (local) memory. Further, an advantage in which the memory of the host machine can be more flexibly used may be provided. Meanwhile, among the multiple nodes, most of the CPUs are in an idle state and a node that does not use memory is definitely present. This is an inevitable problem because the resources used by an application are determined at runtime. In this situation, the flexible use of memory resources may increase the utilization rate of resources for multiple systems and make it possible to flexibly respond to a request from a user to allocate the resources.

However, the use of the memory of a remote machine causes other problems. First, because the resources used by an application are determined at runtime, the node providing the memory therefor may also lack memory. Second, when a predictable problem occurs in a host providing its memory as remote memory, a CPU resource using the corresponding remote memory is required to be terminated in order to solve the problem, and execution of the running Operating System (OS) and application is stopped.

These problems arise from the assumption that a memory disaggregation system using remote memory fixes the location of the remote memory. This assumption is the main obstacle to wide application of a memory disaggregation system.

SUMMARY OF THE INVENTION

An object of the present invention is to provide a method and apparatus for managing memory in a memory disaggregation system that is capable of dynamically migrating remote memory, to which the memory disaggregation system refers, without interrupting a virtual machine operating in the memory disaggregation system or an OS and applications running on the virtual machine.

According to an embodiment of the present invention, there is provided a method for managing disaggregated memory, including local memory used by a virtual machine and at least one remote memory unit, in a disaggregated memory management apparatus located in the virtual machine in a physical node. The method includes selecting, depending on the proportion of valid pages, direct transfer between remote memory units or indirect transfer via the local memory for each of the memory pages of the source remote memory to be migrated, among the at least one remote memory units, transferring the memory pages of the source remote memory to target remote memory depending on the direct transfer or the indirect transfer, and releasing the source remote memory.

Selecting the direct transfer or the indirect transfer may include setting a transfer mode to the direct transfer when the proportion of the valid pages of the source remote memory is greater than a set parameter value, allocating the target remote memory, selecting the memory pages to directly transfer, and requesting the source remote memory to directly transfer the selected memory pages to the target remote memory.

Selecting the direct transfer or the indirect transfer may include setting a transfer mode to the indirect transfer when the proportion of the valid pages of the source remote memory is equal to or less than a set parameter value, allocating the target remote memory, fetching, to the local memory, memory pages remaining after direct transfer, and decreasing the number of valid pages.

Selecting the direct transfer or the indirect transfer may further include selecting a victim page from the local memory and transferring the victim page to the target remote memory.

Selecting the victim page may include selecting, as the victim page, a page that is less likely to be accessed or a page that is not used for a set period, among memory pages of the local memory.

Releasing the source remote memory may include stopping use of the source remote memory when the number of valid pages of the source remote memory becomes 0.

Selecting the direct transfer or the indirect transfer may include make a setting to prohibit writing to the source remote memory, and in response to a request to write to the source remote memory, delivering the request to the target remote memory.

According to another embodiment of the present invention, there is provided an apparatus for managing disaggregated memory, which is located in a virtual machine in a physical node. The apparatus includes disaggregated memory and a processor. The disaggregated memory includes local memory and at least one remote memory unit. The processor makes a setting to prohibit writing to the source remote memory to migrate, among the at least one remote memory unit, sets a transfer mode to direct transfer between remote memory units or indirect transfer via the local memory depending on the proportion of valid pages until the number of valid pages of the source remote memory becomes 0, migrates the memory pages of the source remote memory to target remote memory based on the set transfer mode.

The processor may set the transfer mode to the direct transfer when the proportion of the valid pages of the source remote memory is greater than a set parameter value, and the source remote memory may directly transfer part of the memory pages to the target remote memory based on the direct transfer and decrease the number of valid pages.

The processor may select a memory page that is less likely to be accessed as the part of the memory pages to directly transfer.

The processor may set the transfer mode to the indirect transfer when the proportion of the valid pages of the source remote memory is equal to or less than the parameter value, and fetch, to the local memory, memory pages remaining after the direct transfer, and the source remote memory may decrease the number of valid pages.

The processor may transfer a page that is less likely to be accessed in the local memory or a page that is not used in the local memory for a set period to the target remote memory.

When a request to write to the source remote memory is made before migration of the memory pages of the source remote memory to the target remote memory is completed, the processor may deliver the request to the target remote memory.

The processor may release the source remote memory when the number of valid pages of the source remote memory becomes 0.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
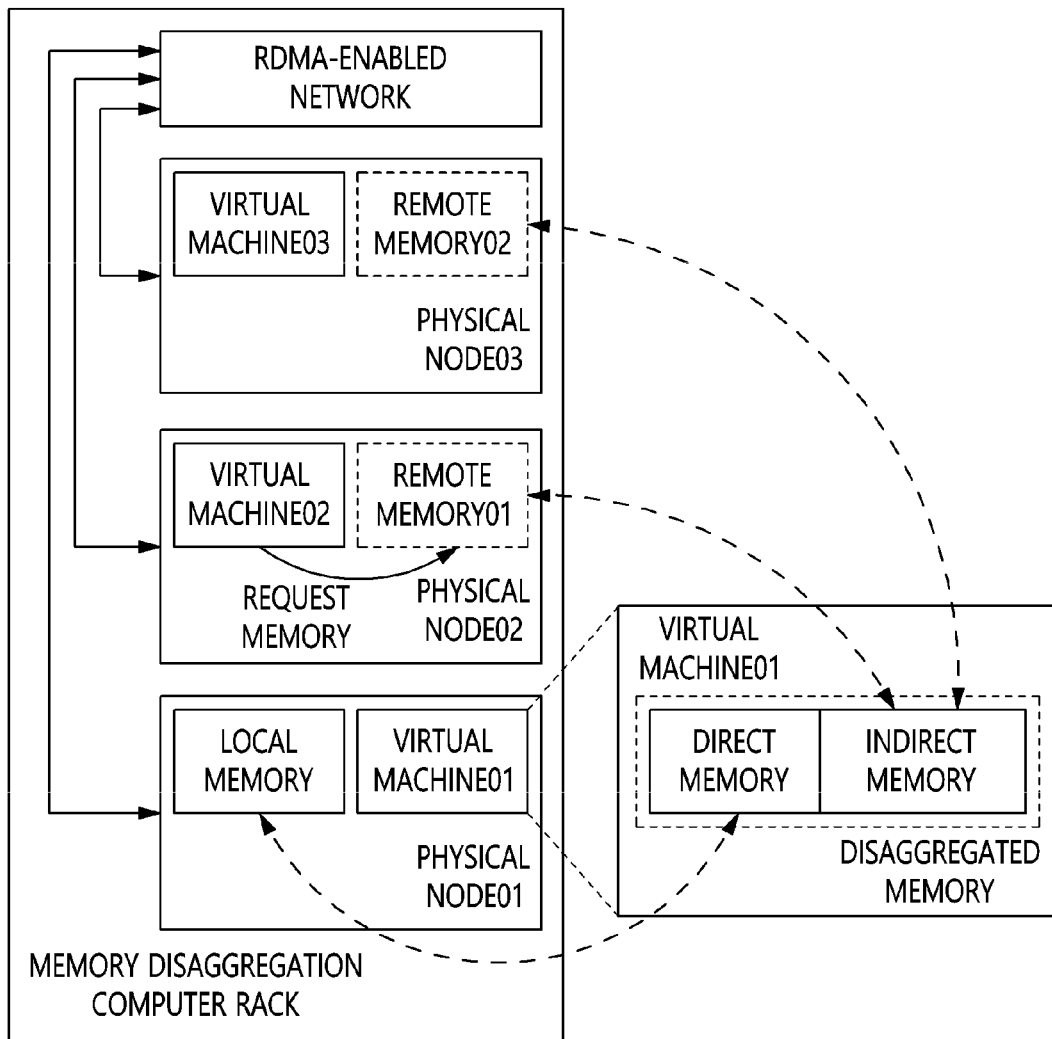
FIG. 1 is a view illustrating an example of a memory disaggregation system according to an embodiment of the present invention.

Hereinafter, an embodiment of the present invention will be described in detail with reference to the accompanying drawings so that those having ordinary knowledge in the technical field to which the present invention pertains can easily practice the present invention. However, the present invention may be implemented in different forms and is not limited to the embodiment described herein. Also, a part unrelated to a description is omitted in the drawings in order to clearly describe the present invention, and similar reference numerals are used for similar parts throughout the specification.

Throughout this specification and claims, the terms "comprises" and/or "comprising" and "includes" and/or "including" specify the presence of stated elements but do not preclude the presence or addition of one or more other elements unless otherwise specified.

Hereinafter, a method and apparatus for managing memory in a memory disaggregation system according to an embodiment of the present invention will be described in detail with reference to the accompanying drawings.

FIG. 1 is a view illustrating an example of a memory disaggregation system according to an embodiment of the present invention.

Referring to FIG. 1, a memory disaggregation computer rack is configured with multiple physical nodes, and includes a Remote Direct Memory Access (RDMA)-enabled network.

The RDMA-enabled network provides a function through which the memory of a remote system can be accessed without interrupting CPU processing of the remote system.

In each of the physical nodes, at least one virtual machine may operate. Here, the virtual machine is configured with one or more virtual CPUs and virtual memory, the configuration of which can be dynamically changed. The virtual CPU operates by being scheduled on a physical CPU depending on the operation of the virtual machine. The virtual memory may be configured based on local memory, which shares the same host system with the physical CPU to be scheduled for the virtual CPU, and multiple remote memory units, with which the host system is not shared. Here, the respective remote memory units may be located in the multiple physical nodes connected to the network.

For example, in FIG. 1, virtual machine 01 located in physical node 01 may configure disaggregated memory using local memory present in the physical node 01, remote memory 01 located in physical node 02, and remote memory 02 located in physical node 03, and the disaggregated memory configured in this manner may be used as virtual memory in the virtual machine 01. Also, in a single disaggregated memory unit, memory using the local memory of a host system is directly accessible by a virtual CPU, and is called 'direct memory', and memory using remote memory is memory to which access by the virtual CPU is allowed only via the local memory, and is called 'indirect memory'.

When a virtual machine accesses a direct memory area, a virtual CPU is able to access the direct memory without performing any additional tasks. However, when it accesses an indirect memory area, because the virtual CPU is not able to access the indirect memory, the memory page to which access is attempted by the virtual CPU is fetched from remote memory to local memory, after which corresponding data is accessed. Then, the data area accessed by the virtual CPU is managed as direct memory, rather than as indirect memory.

Here, releasing the remote memory in use may be required for various reasons. For example, a situation in which virtual machine 02 operating in the physical node 02, as shown in FIG. 1, makes an additional request for local memory may occur. Here, the local memory used by the virtual machine 02 is the same memory as the remote memory 01 used by the virtual machine 01. If this situation is not resolved, normal operation of the virtual machine 02 is not supported, or the virtual machine 02 has to continuously access remote memory, whereby the performance of an application running on the virtual machine 02 may be significantly degraded. Also, in the situation in which data for an operation in the virtual machine 01 is located in the remote memory 01 in the physical node 02, when the network latency time for access to the remote memory 01 increases due to the network state between the physical node 01 and the physical node 02, the performance of the virtual machine 01 may also be degraded due to the increased latency time in the access to the remote memory. Also, when hardware failure in the physical node 03 is reported, it is necessary to release resources in the corresponding system, but the existing memory disaggregation system has a problem in which the virtual machine 01 operating in the physical node 01 has to be terminated for the maintenance task of the physical node 03 due to the absence of management of the remote memory.

As described above, because dynamic migration of remote memory is not yet commonly implemented in memory disaggregation systems, flexibility in the use of resources in the memory disaggregation systems is decreased, and in the event of hardware failure, the virtual machine that is currently running is required to be interrupted in order to respond thereto. In order to solve these problems, an embodiment of the present invention provides dynamic migration of remote memory, to which a memory disaggregation system refers, without interrupting a virtual machine operating in the memory disaggregation system and an OS and applications running on the virtual machine.

Figure 2:
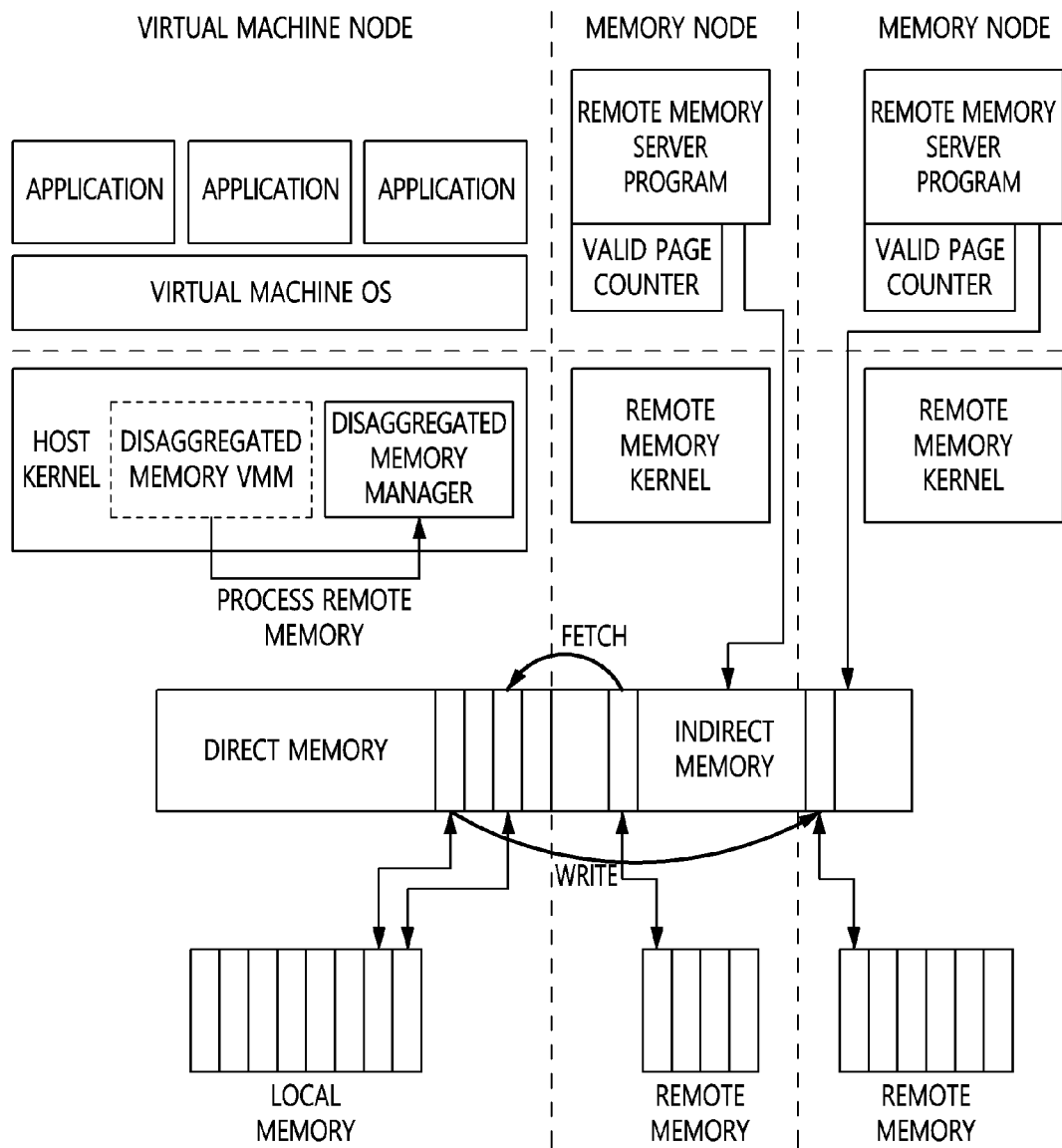
FIG. 2 is a view illustrating the structures of a virtual machine node and a memory node in a memory disaggregation system according to an embodiment of the present invention.

FIG. 2 is a view illustrating the structures of a virtual machine node and a memory node in a memory disaggregation system according to an embodiment of the present invention.

Referring to FIG. 2, a virtual machine OS or at least one application is installed and executed in a virtual machine node. Also, a disaggregated memory manager present in the virtual machine node manages direct memory and indirect memory.

The disaggregated memory manager fetches memory data from remote memory to local memory in response to access to the indirect memory by a virtual machine, and in order to solve the problem of insufficient space in the local memory caused due to the fetched data, the disaggregated memory manager may select memory data that is less likely to be accessed or is not recently used from the local memory and write the same to the remote memory. Here, a remote memory server program, which is a single application, operates in a memory node. The remote memory server program is allocated the memory to be provided as remote memory from a remote memory kernel, and notifies the disaggregated memory manager of information thereabout so that the disaggregated memory manager is able to use the remote memory. A processor that executes the remote memory server program in the memory node is referred to as a remote memory server, and the remote memory server operates in the memory node so as to provide memory to a virtual machine. The memory node is a node that provides a part of idle memory possessed thereby to a virtual machine operating in the memory node or a virtual machine located and operating in a virtual machine node, other than the memory node, and also indicates a physical node in which the remote memory server operates.

The remote memory server counts the number of valid pages stored in each server using a valid page counter and stores the number of valid pages. That is, a request to write data to the remote memory increases the number of valid pages, and a request to fetch from the remote memory decreases the number of valid pages.

Figure 3:
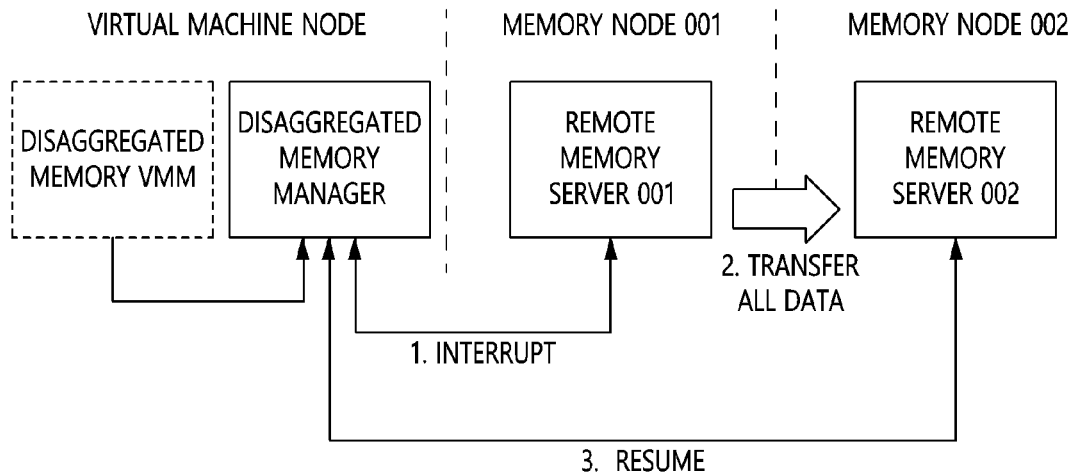
FIG. 3 is a view for explaining migration of remote memory by a disaggregated memory manager according to an embodiment of the present invention.

FIG. 3 is a view for explaining migration of remote memory by a disaggregated memory manager according to an embodiment of the present invention.

Referring to FIG. 3, a disaggregated-memory virtual-machine monitor (VMM) in a virtual-machine node is a virtual-machine monitor for a disaggregated memory system, and handles events occurring in a virtual machine. Here, in response to an attempt to access indirect memory, the disaggregated-memory VMM operates so as to deliver information thereabout to a disaggregated memory manager such that the disaggregated memory manager processes the access attempt.

When a lack of memory occurs in memory node 001, the memory node 001 notifies the disaggregated memory manager operating in the virtual machine node about the lack of memory.

The disaggregated memory manager interrupts the operation of the relevant virtual machine and tells the method of accessing remote memory, that is, the method of accessing memory that is allocated from remote memory server 001 in memory node 001 and remote memory server 002 in memory node 002 in order to provide the memory to the virtual machine, to the remote memory server 001 and the remote memory server 002, after which the remote memory server 001 transfers memory data in the corresponding server to the remote memory server 002.

When the transfer of the memory data to the remote memory server 002 finishes, the corresponding virtual machine no longer uses the remote memory 001, and resumes its operation using the remote memory 002.

The method that requires interruption of a virtual machine, transfer of memory data, and resumption of the virtual machine may minimize the amount of transferred memory data, but during this operation, the operation of the virtual machine has to be interrupted, which causes an application or service operating using the virtual machine to be stopped.

In an embodiment of the present invention, using two paths, remote memory is migrated simultaneously with the operation of a memory disaggregation system. That is, in an embodiment of the present invention, remote memory to which a memory disaggregation system refers is migrated without interrupting a virtual machine operating in the memory disaggregation system or an OS and applications running on the virtual machine. To this end, an operation provided by a specific remote memory server, such as reading from or writing to remote memory, which is caused by the corresponding virtual machine during its operation, should be performed simultaneously with migration from the memory node in which the specific remote memory server is currently located to another memory node.

Figure 4:
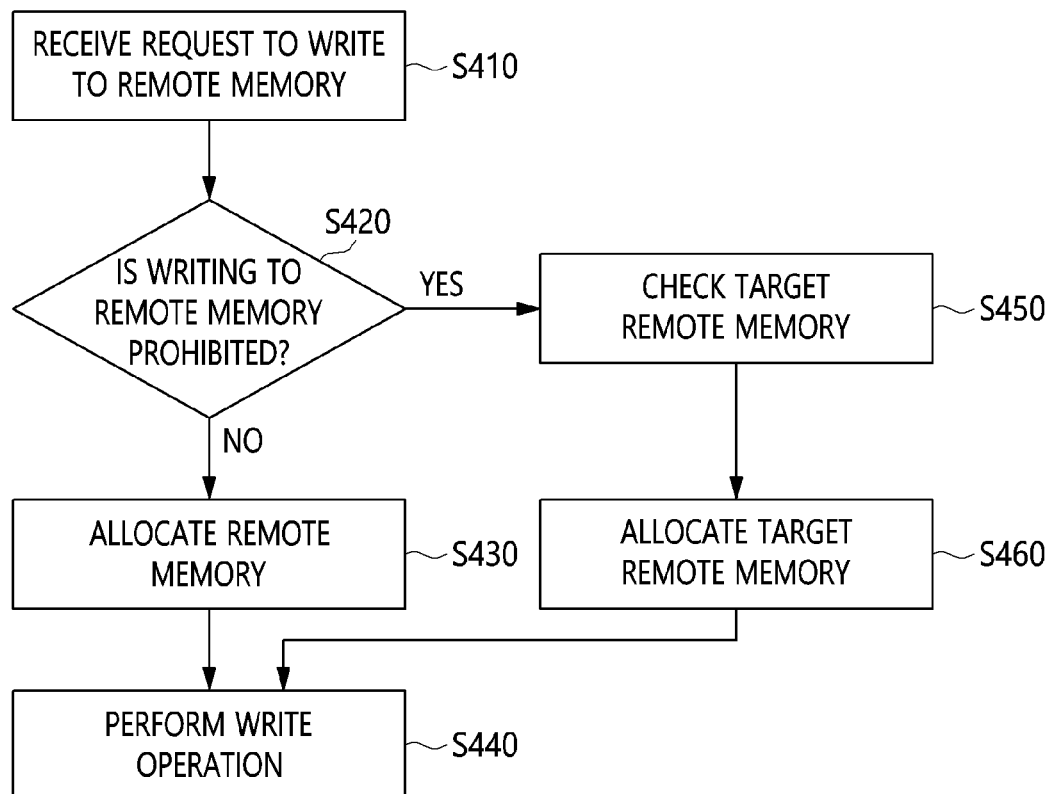
FIG. 4 is a flowchart illustrating a method for implementing writing to remote memory according to an embodiment of the present invention.

FIG. 4 is a flowchart illustrating a method of implementing writing to remote memory according to an embodiment of the present invention.

As illustrated in FIG. 4, in order to change a remote memory server to another remote memory server (in order to migrate data of a remote memory server to another remote memory server), a disaggregated memory manager running on a virtual machine allows fetching from the source remote memory server, but prohibits a write operation.

Upon receiving a request to write data to remote memory at step S410, the disaggregated memory manager checks at step S420 whether a setting is made to prohibit writing to the corresponding remote memory.

When no setting is made to prohibit writing to the remote memory, the disaggregated memory manager allocates the remote memory at step S430 and performs the operation of writing to the allocated remote memory at step S440.

On the other hand, when a setting is made to prohibit writing to the corresponding remote memory, the disaggregated memory manager determines that the corresponding remote memory is the remote memory to be migrated, and checks new target remote memory to which the write request is to be delivered at step S450.

The disaggregated memory manager allocates the new target remote memory at step S460 and performs the operation of writing to the allocated target remote memory at step S440.

As described above, in order to change remote memory server 001 in memory node 001 to remote memory server 002 in memory node 002, the disaggregated memory manager allows fetching from remote memory server 001 but forbids an operation of writing thereto. Also, when an operation of writing to the remote memory server 001, which is to be changed to the remote memory server 002, is requested, the disaggregated memory manager causes the request to be processed in the remote memory server 002. The operation performed in this way decreases the number of valid pages in the remote memory server 001 and makes it possible to check whether the remote memory server 001 can be released through the valid page counter corresponding thereto.

Figure 5:
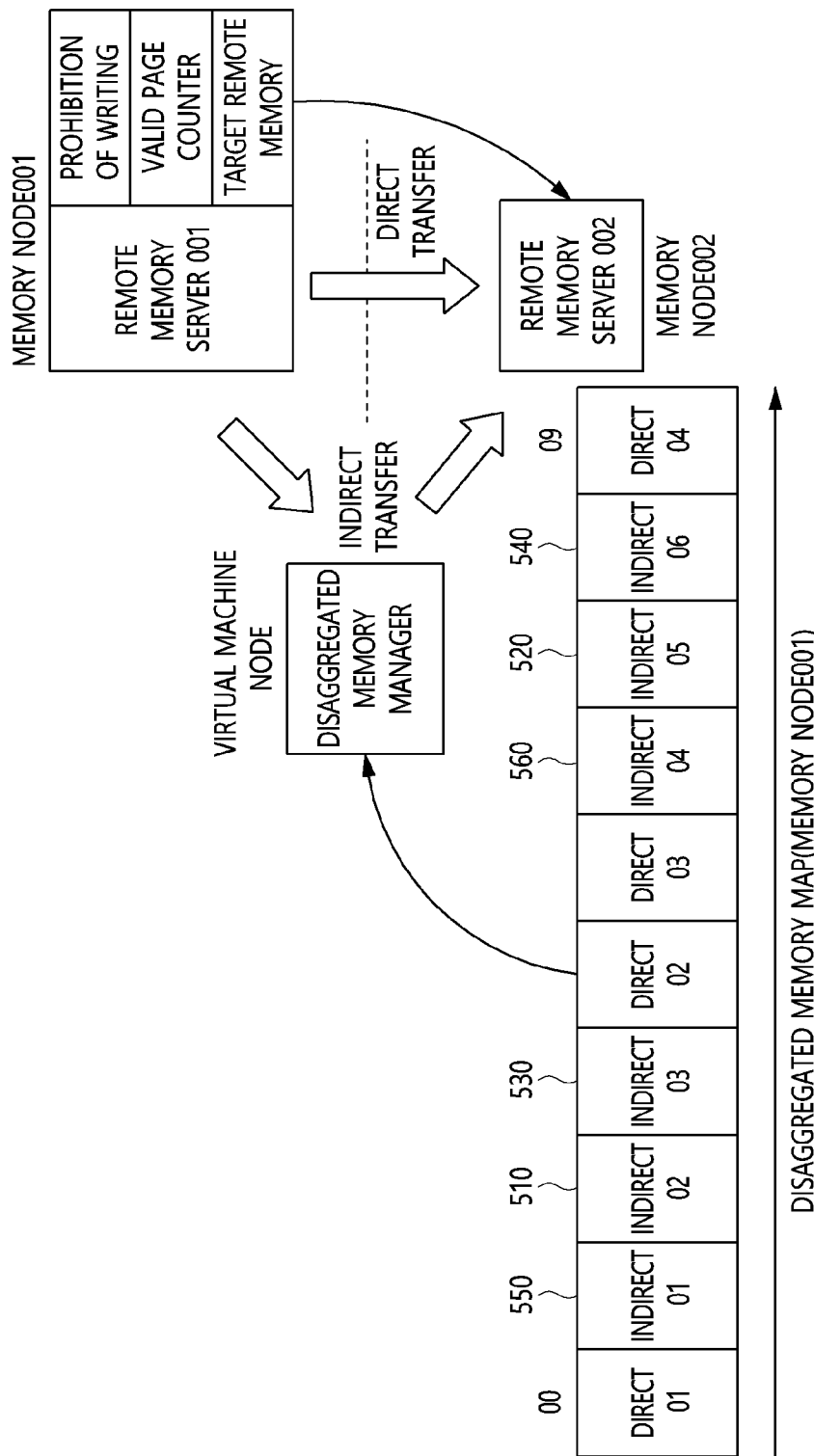
FIG. 5 is a view for explaining a method for migrating remote memory by a disaggregated memory manager according to an embodiment of the present invention.

FIG. 5 is a view for explaining a method for migrating remote memory by a disaggregated memory manager according to an embodiment of the present invention.

Referring to FIG. 5, a disaggregated memory manager scans a disaggregated memory map and selects direct transfer or indirect transfer for each page depending on a memory access probability. Here, the disaggregated memory manager first selects the pages to directly transfer, performs direct transfer by requesting a remote memory server to perform direct transfer, and causes the remaining pages to be transferred via a virtual machine node, in which a virtual machine is operating, using indirect transfer.

Specifically, the disaggregated memory manager selects pages that are less likely to be accessed during the migration time of remote memory server 001 through the first scan of the disaggregated memory map, allocates a page of the new remote memory server 002 for each of the selected pages, and requests direct transfer from the remote memory server 001 to the remote memory server 002.

For example, the disaggregated memory manager scans the disaggregated memory map from page 00 to page 09 and predicts the possibility that access to data in each of the pages of indirect memory will be requested. The disaggregated memory manager may select indirect 02 page 510 and indirect 05 page 520 based on a next-block-prefetching algorithm, which defines that a page close to direct memory is likely to be accessed next, and may request direct transfer of data stored in these pages from the remote memory server 001 to the remote memory server 002. Then, indirect 03 page 530 and indirect 06 page 540 are selected through the second scan of the disaggregated memory map, and the direct transfer thereof may be requested. After the disaggregated memory manager scans the disaggregated memory map twice, the number of valid pages (the valid page counter), the initial value of which was 6, decreases to 2. Then, after the disaggregated memory manager fetches data of indirect 01 page 550 and indirect 04 page 560 from the remote memory server 001 to the virtual machine node by performing indirect transfer thereof, when these pages are not used for a certain time, the disaggregated memory manager makes a request to write these pages to the remote memory server 002. Here, the disaggregated memory manager may select direct transfer or indirect transfer based on the proportion of the valid pages of the remote memory server 001, and may decide on direct transfer or indirect transfer by comparing the proportion of the valid pages with a set parameter value. The proportion of the valid pages of the remote memory server 001 is defined as the proportion of the number of valid pages to the total number of pages of the memory provided by the remote memory server 001.

Figure 6:
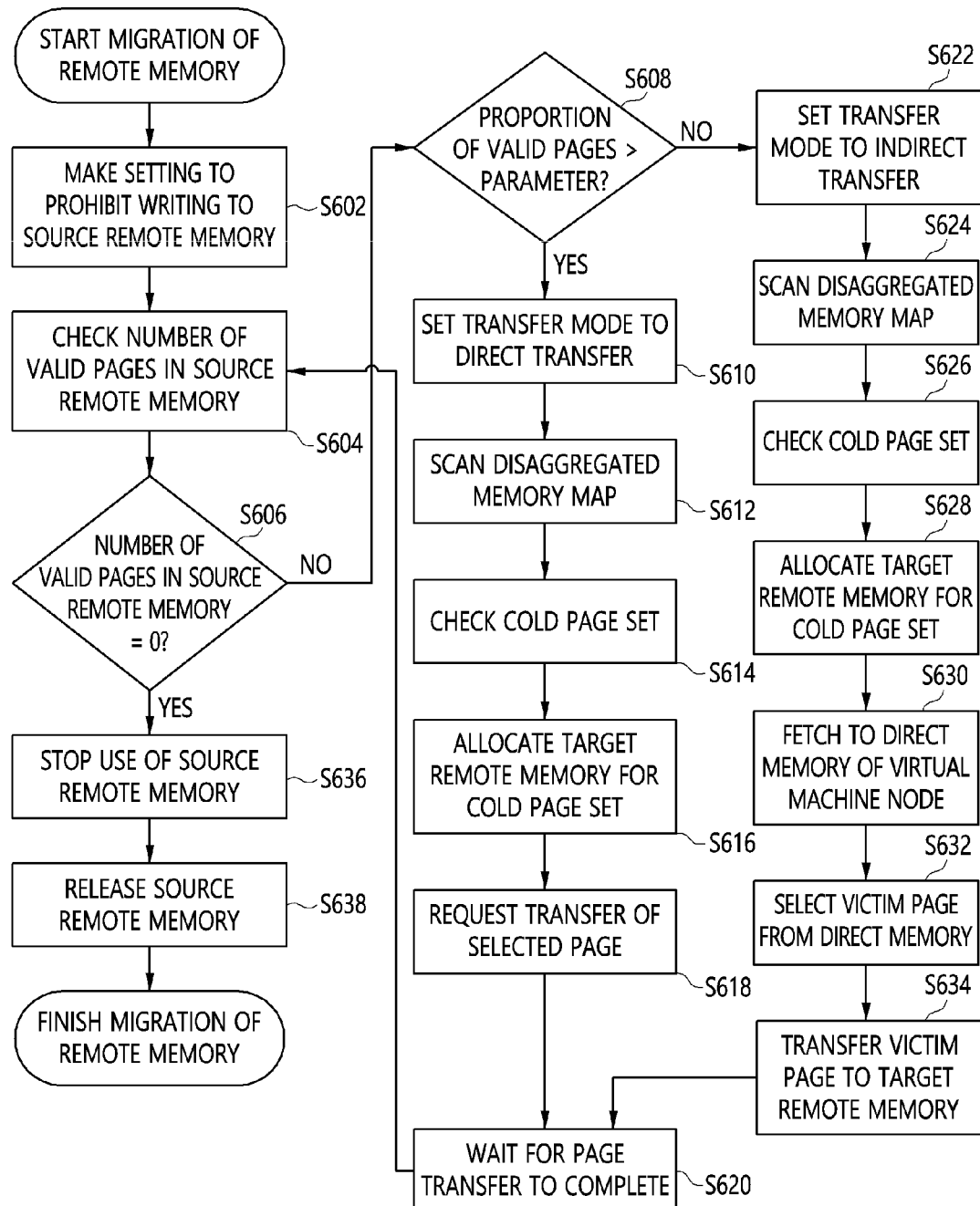
FIG. 6 is a flowchart for explaining a method for migrating remote memory according to an embodiment of the present invention.

FIG. 6 is a flowchart for explaining a method for migrating remote memory according to an embodiment of the present invention.

Referring to FIG. 6, when migration of data in source remote memory is started, a disaggregated memory manager first makes a setting to prohibit writing to the source remote memory at step S602. When a request to write to the source remote memory is made, the disaggregated memory manager delivers the write request to new target remote memory.

The disaggregated memory manager checks the number of valid pages in the source remote memory at step S604.

The disaggregated memory manager sets a transfer mode depending on the proportion of the valid pages until the number of valid pages in the source remote memory becomes 0.

Specifically, when the number of valid pages is not 0, the disaggregated memory manager compares the proportion of the valid pages with a set parameter value at step S606. When the proportion of the valid pages is greater than the parameter value at step S608, the disaggregated memory manager sets the transfer mode to direct transfer at step S610 and checks a cold page set by scanning a disaggregated memory map at steps S612 and S614. The disaggregated memory manager allocates the target remote memory for the cold page set at step S616, selects, from the disaggregated memory map, the pages to be directly transferred, and requests the source remote memory to directly transfer the selected pages at step S618. The cold page set is a set of pages that are located in the source remote memory and are not yet transferred to the target remote memory. After it completes the direct transfer of the selected pages to the target remote memory, the source remote memory decreases the number of valid pages using a valid page counter and waits at step S620.

When the proportion of the valid pages is equal to or less than the parameter value at step S608, the disaggregated memory manager sets the transfer mode to indirect transfer at step S622 and checks a cold page set by scanning the disaggregated memory map at steps S624 and S626. The disaggregated memory manager allocates the target remote memory for the cold page set at step S628, fetches, to the direct memory of a virtual machine node, the pages remaining after direct transfer at step S630, decreases the number of valid pages through the valid page counter, and waits. Then, the disaggregated memory manager selects a victim page from the direct memory at step S632, transfers the victim page to the target remote memory at step S634, and waits at step S620. Here, the disaggregated memory manager may select a page that is less likely to be accessed as the victim page. The disaggregated memory manager may select a page that has not been recently used as the victim page.

The disaggregated memory manager repeats steps S608 to S634 until the number of valid pages in the source remote memory becomes 0. When there is a large number of pages to migrate from the source remote memory, the disaggregated memory manager quickly transfers some of the pages to the target remote memory through direct transfer, and when the proportion of the valid pages becomes equal to or less than the parameter value, the disaggregated memory manager transfers the remaining pages through indirect transfer.

Meanwhile, when the number of valid pages in the source remote memory becomes 0 at step S606, the disaggregated memory manager stops the use of the source remote memory at step S636 and releases the source remote memory at step S638, thereby terminating migration of the remote memory.

Figure 7:
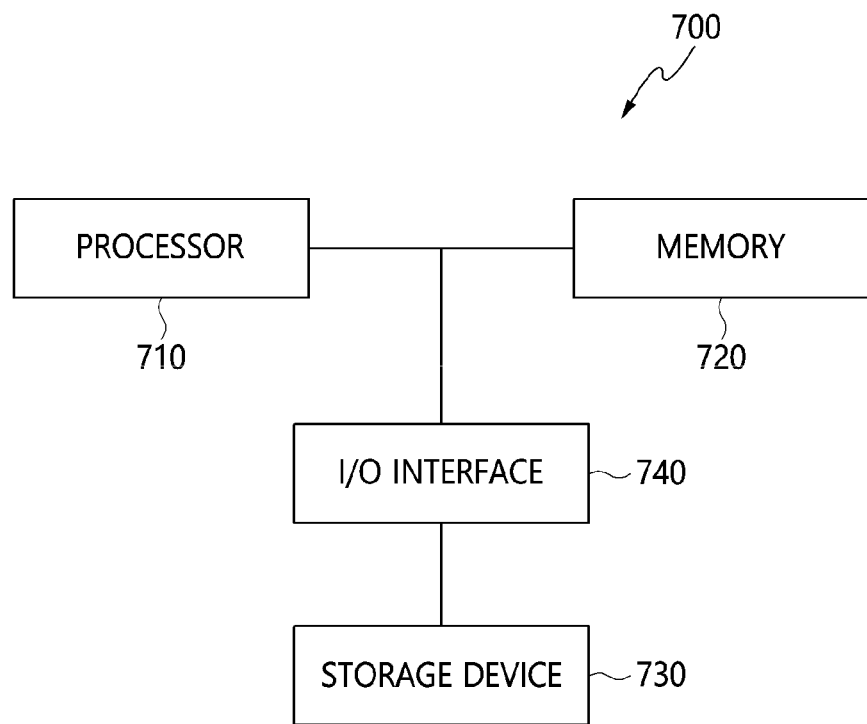
FIG. 7 is a view illustrating a disaggregated memory manager according to an embodiment of the present invention.

FIG. 7 is a view illustrating a disaggregated memory manager according to another embodiment of the present invention, and illustrates a system that can be used for performing at least some of the disaggregated memory management functions of the disaggregated memory manager described with reference to FIGS. 4 to 6.

Referring to FIG. 7, the apparatus 700 for managing disaggregated memory includes a processor 710, memory 720, a storage device 730, and an input/output (I/O) interface 740.

The processor 710 may be implemented as a central processing unit (CPU), a chipset, a microprocessor, or the like.

The memory 720 may be implemented as a medium such as RAM, including dynamic random-access memory (DRAM), Rambus DRAM (RDRAM), synchronous DRAM (SDRAM), static RAM (SRAM), and the like.

The storage device 730 may be implemented as a non-volatile or volatile storage device, such as a hard disk, optical disks, such as a compact disk read-only memory (CD-ROM), rewritable CD (CD-RW), digital video disk ROM (DVD-ROM), DVD-RAM, a DVD-RW disk, a Blu-Ray disk, and the like, flash memory, and various types of RAM.

The I/O interface 740 enables the processor 710 and/or the memory 720 to access the storage device 730. The memory 720 or the storage device 730 may include virtual memory used by a virtual machine. Also, the I/O interface 740 may provide an interface with the outside, e.g., an interface with a user.

The processor 710 may perform the disaggregated memory management function of the disaggregated memory manager described in FIGS. 4 to 6, and may load program instructions for implementing the disaggregated memory management function onto the memory 720, thereby performing control so that the operation described with reference to FIGS. 4 to 6 is performed. Also, these program instructions may be stored in the storage device 730, or may be stored in another system connected via a network.

According to an embodiment of the present invention, migration of remote memory may be dynamically performed in a memory disaggregation system. That is, the location of the remote memory is changed in the situation in which a kernel and applications running on a virtual machine continuously operate, making it possible to adaptively respond to a dynamic request for memory resources and actively respond to hardware failure.

Although the embodiment of the present invention has been described in detail above, the scope of the present invention is not limited thereto, and those skilled in the art will appreciate that various modifications, additions and substitutions using the basic concept of the present invention defined in the accompanying claims are also included in the scope of the present invention.

What is claimed is:

1. A method for migrating remote memory of disaggregated memory, the method comprising:
selecting direct transfer or indirect transfer for at least one memory page of source remote memory to be migrated;
transferring the at least one memory page of the source remote memory to target remote memory based on at least one of the direct transfer or the indirect transfer for completing a migration of the source remote memory; and
releasing the source remote memory,
wherein the transferring the at least one memory page comprises,
transferring a first group of memory pages of the source remote memory to the target remote memory according to the direct transfer, and
transferring a second group of the memory pages of the source remote memory to the target remote memory according to the indirect transfer,
wherein
the direct transfer is configured to transfer data of the source remote memory to the target remote memory for the migration, and
the indirect transfer allows fetching from the source remote memory but does not allow writing to the source remote memory for the migration.

2. The method of claim 1, wherein selecting the direct transfer or the indirect transfer selects the direct transfer or the indirect transfer based on a memory access probability of the at least one memory page.

3. The method of claim 2, wherein selecting the direct transfer or the indirect transfer selects,
the direct transfer for the first group which corresponds to a low memory access probability, and
the indirect transfer for the second group which corresponds to a high memory access probability.

4. An apparatus for migrating remote memory of disaggregated memory, the apparatus comprising:
disaggregated memory including local memory and at least one remote memory unit, and
a processor for setting a transfer mode to direct transfer or indirect transfer for at least one memory page of source remote memory to be migrated, and transferring the at least one memory page of the source remote memory to target remote memory based on the transfer mode,
wherein the direct transfer is applied to a first group of memory pages of the source remote memory, and the indirect transfer is applied to a second group of the memory pages of the source remote memory, and
wherein
the direct transfer is configured to transfer data of the source remote memory to the target remote memory for the migration, and
the indirect transfer allows fetching from the source remote memory but does not allow writing to the source remote memory for the migration.

5. The apparatus of claim 4, wherein the transfer mode is set based on a memory access probability of the at least one memory page.

6. The apparatus of claim 5, wherein the transfer mode is set to,
the direct transfer for the first group which corresponds to a low memory access probability, and
the indirect transfer for the second group which corresponds to a high memory access probability.

* * * * *